(12) United States Patent
Jaskiewicz

(10) Patent No.: US 12,480,357 B2
(45) Date of Patent: Nov. 25, 2025

(54) DOOR STILE WITH COMPOSITE EDGE BANDING AND METHOD OF MANUFACTURING THE SAME

(71) Applicant: Endura Products, LLC, Colfax, NC (US)

(72) Inventor: Tomasz Jaskiewicz, Oak Ridge, NC (US)

(73) Assignee: Endura Products, LLC, Colfax, NC (US)

( * ) Notice: Subject to any disclaimer, the term of this patent is extended or adjusted under 35 U.S.C. 154(b) by 669 days.

(21) Appl. No.: 17/736,174

(22) Filed: May 4, 2022

(65) Prior Publication Data

US 2022/0356750 A1    Nov. 10, 2022

Related U.S. Application Data

(60) Provisional application No. 63/183,705, filed on May 4, 2021.

(51) Int. Cl.
*E06B 3/72* (2006.01)
(52) U.S. Cl.
CPC ..................... *E06B 3/72* (2013.01)
(58) Field of Classification Search
CPC ... E06B 3/72; E06B 3/74; E06B 3/825; E06B 3/84; B27D 5/003; B27D 5/006; B27M 3/0086
See application file for complete search history.

(56) References Cited

U.S. PATENT DOCUMENTS

| | | |
|---|---|---|
| 11,134 A | 6/1854 | Morris |
| 34,664 A | 3/1862 | Shaw |
| D6,684 S | 5/1873 | Coffin |
| 204,740 A | 6/1878 | Johnson |
| 1,950,519 A | 3/1934 | Ripley |
| D132,934 S | 6/1942 | Freeman |
| 2,317,231 A | 4/1943 | Swedman |
| 2,616,531 A | 11/1952 | Young |
| D177,424 S | 4/1956 | Moore et al. |
| D183,028 S | 6/1958 | Spilman et al. |
| 2,863,534 A | 12/1958 | Gillespie |
| D189,988 S | 3/1961 | Freeman et al. |
| D189,991 S | 3/1961 | Kenney et al. |
| 3,371,702 A | 3/1968 | Keegan et al. |

(Continued)

FOREIGN PATENT DOCUMENTS

| | | |
|---|---|---|
| CA | 2997330 A1 | 9/2018 |
| DE | 3509101 A1 * | 9/1986 |

(Continued)

OTHER PUBLICATIONS

Machine translation of DE3509101 from Espacenet (Year: 2024).*

(Continued)

*Primary Examiner* — Christine T Cajilig
(74) *Attorney, Agent, or Firm* — IceMiller LLP

(57) ABSTRACT

A method of manufacturing a door stile includes bonding a composite edge band to a first side of a core and profiling the composite edge band. The edge band includes a hollow that is defined through the composite edge band to flex when compressed into the first side of the core. Profiling the composite edge band includes removing portions of the composite edge band that define the hollows.

20 Claims, 3 Drawing Sheets

(56) References Cited

U.S. PATENT DOCUMENTS

| | | | |
|---|---|---|---|
| 3,609,928 A | 10/1971 | Mock | |
| 3,774,344 A | 11/1973 | Symons | |
| 3,837,134 A * | 9/1974 | DiFazio | E06B 3/825 |
| | | | 52/800.14 |
| 3,885,351 A | 5/1975 | Imperial et al. | |
| 3,918,228 A | 11/1975 | Laborde | |
| 3,974,606 A | 8/1976 | Laborde | |
| 3,991,806 A | 11/1976 | Abell | |
| 4,086,739 A | 5/1978 | Hall | |
| 4,184,297 A | 1/1980 | Casamayor | |
| 4,258,520 A | 3/1981 | Rehbein | |
| 4,281,480 A | 8/1981 | Wendt | |
| 4,330,972 A | 5/1982 | Sailor | |
| 4,361,979 A | 12/1982 | Petersson | |
| 4,397,117 A | 8/1983 | Shipp | |
| 4,407,100 A | 10/1983 | Huelsekopf | |
| 4,430,830 A | 2/1984 | Sailor | |
| 4,439,935 A | 4/1984 | Kelly | |
| 4,439,965 A | 4/1984 | Langenhorst | |
| 4,452,029 A | 6/1984 | Sukolics | |
| 4,454,699 A | 6/1984 | Strobl | |
| 4,608,796 A | 9/1986 | Shea, Jr. | |
| 4,665,666 A | 5/1987 | Hampton | |
| D296,135 S | 6/1988 | Dreiling | |
| 4,748,780 A | 6/1988 | Vinther | |
| 4,947,597 A | 8/1990 | Simpson | |
| D310,521 S | 9/1990 | Leung | |
| 5,003,743 A | 4/1991 | Bifano et al. | |
| 5,022,206 A | 6/1991 | Schield et al. | |
| 5,027,572 A | 7/1991 | Purcell et al. | |
| 5,058,323 A | 10/1991 | Gerritsen | |
| 5,062,250 A | 11/1991 | Buzzella | |
| 5,182,880 A | 2/1993 | Berge et al. | |
| 5,203,130 A | 4/1993 | Freelove | |
| 5,261,756 A | 11/1993 | Kohn | |
| 5,313,755 A | 5/1994 | Koenig, Jr. | |
| 5,377,464 A | 1/1995 | Mott et al. | |
| 5,378,007 A | 1/1995 | Joyce | |
| D356,335 S | 3/1995 | Mak | |
| D356,824 S | 3/1995 | Mak | |
| 5,398,468 A | 3/1995 | Erickson | |
| D358,476 S | 5/1995 | Winkos | |
| 5,433,563 A * | 7/1995 | Velepec | B27G 13/14 |
| | | | 409/234 |
| 5,435,106 A | 7/1995 | Garries et al. | |
| 5,448,864 A | 9/1995 | Rosamond | |
| 5,491,940 A | 2/1996 | Bruchu | |
| 5,491,951 A | 2/1996 | Riegelman | |
| 5,511,355 A | 4/1996 | Dingler | |
| 5,528,869 A | 6/1996 | Boomer et al. | |
| 5,539,027 A | 7/1996 | Deaner et al. | |
| 5,540,019 A | 7/1996 | Beske et al. | |
| 5,555,684 A | 9/1996 | Galowitz et al. | |
| 5,577,363 A | 11/1996 | Tate et al. | |
| 5,590,496 A | 1/1997 | Martin et al. | |
| 5,622,017 A | 4/1997 | Lynn et al. | |
| 5,634,303 A | 6/1997 | Ellingson | |
| 5,669,192 A | 9/1997 | Opdyke et al. | |
| 5,695,874 A | 12/1997 | Deaner et al. | |
| 5,758,458 A | 6/1998 | Ridge | |
| 5,759,680 A | 6/1998 | Brooks et al. | |
| 5,773,138 A | 6/1998 | Seethamraju et al. | |
| 5,791,113 A | 8/1998 | Glowa et al. | |
| 5,827,607 A | 10/1998 | Deaner et al. | |
| 5,836,118 A | 11/1998 | Thornton et al. | |
| 5,847,016 A | 12/1998 | Cope | |
| 5,873,209 A | 2/1999 | Hagel | |
| 5,901,510 A | 5/1999 | Ellingson | |
| 5,932,334 A | 8/1999 | Deaner et al. | |
| 5,941,033 A | 8/1999 | Adams | |
| 5,981,631 A | 11/1999 | Ronden et al. | |
| 5,985,429 A | 11/1999 | Plummer et al. | |
| 5,987,843 A | 11/1999 | Canfield | |
| 6,003,277 A | 12/1999 | Graham et al. | |
| 6,004,668 A | 12/1999 | Deaner et al. | |
| 6,011,091 A | 1/2000 | Zehner | |
| 6,015,611 A | 1/2000 | Deaner et al. | |
| 6,015,612 A | 1/2000 | Deaner et al. | |
| 6,066,680 A | 5/2000 | Cope | |
| 6,098,365 A | 8/2000 | Martin et al. | |
| 6,103,791 A | 8/2000 | Zehner | |
| 6,125,605 A | 10/2000 | Young | |
| 6,141,874 A | 11/2000 | Olsen | |
| 6,143,811 A | 11/2000 | Oda et al. | |
| 6,148,582 A | 11/2000 | Ellingson | |
| 6,148,584 A | 11/2000 | Wilson | |
| 6,248,813 B1 | 6/2001 | Zehner | |
| 6,293,060 B1 | 9/2001 | McKann et al. | |
| 6,295,779 B1 | 10/2001 | Canfield | |
| 6,314,701 B1 | 11/2001 | Meyerson | |
| 6,344,268 B1 | 2/2002 | Stucky et al. | |
| 6,344,504 B1 | 2/2002 | Zehner et al. | |
| 6,360,508 B1 | 3/2002 | Pelfrey et al. | |
| 6,378,266 B1 | 4/2002 | Ellingson | |
| 6,393,779 B1 | 5/2002 | Boldt | |
| 6,453,631 B1 | 9/2002 | Headrick | |
| 6,491,468 B1 | 12/2002 | Hagen | |
| 6,498,205 B1 | 12/2002 | Zehner | |
| D473,661 S | 4/2003 | Kim | |
| 6,557,309 B1 | 5/2003 | Johnson | |
| 6,568,137 B2 | 5/2003 | Ballantyne | |
| 6,578,332 B2 | 6/2003 | Bushberger | |
| 6,588,159 B1 | 7/2003 | Cotton, Jr. | |
| 6,590,004 B1 | 7/2003 | Zehner | |
| 6,604,334 B2 | 8/2003 | Rochman | |
| 6,619,005 B1 | 9/2003 | Chen | |
| 6,631,595 B1 | 10/2003 | Minter | |
| 6,675,545 B2 | 1/2004 | Chen et al. | |
| 6,679,004 B1 | 1/2004 | Olberding et al. | |
| 6,680,090 B2 | 1/2004 | Godavarti et al. | |
| D487,936 S | 3/2004 | Habeck et al. | |
| 6,745,526 B1 | 6/2004 | Autovino | |
| 6,761,008 B2 | 7/2004 | Chen et al. | |
| 6,766,621 B2 | 7/2004 | Reppermund | |
| 6,780,359 B1 | 8/2004 | Zehner et al. | |
| D495,705 S | 9/2004 | Borsboom | |
| D501,260 S | 1/2005 | Mitrevics | |
| D501,937 S | 2/2005 | Mitrevics | |
| 6,890,965 B1 | 5/2005 | Johnson et al. | |
| 6,904,726 B2 | 6/2005 | Heard et al. | |
| D507,302 S | 7/2005 | Chen et al. | |
| 6,922,969 B1 | 8/2005 | Sanchez | |
| 6,971,211 B1 | 12/2005 | Zehner | |
| D513,614 S | 1/2006 | Tsao | |
| D513,806 S | 1/2006 | Mitrevics | |
| D515,566 S | 2/2006 | Hwang | |
| D515,568 S | 2/2006 | Hoehn | |
| D515,569 S | 2/2006 | Hoehn | |
| D515,570 S | 2/2006 | Hoehn | |
| D515,571 S | 2/2006 | Hsieh | |
| D515,573 S | 2/2006 | Liaw | |
| D518,045 S | 3/2006 | Tsao | |
| 7,030,179 B2 | 4/2006 | Patterson et al. | |
| 7,043,883 B1 | 5/2006 | Cederberg et al. | |
| D528,519 S | 9/2006 | Lin | |
| 7,111,433 B2 | 9/2006 | Kerscher | |
| D533,527 S | 12/2006 | Tsai et al. | |
| 7,151,125 B2 | 12/2006 | Williams et al. | |
| 7,160,601 B2 | 1/2007 | Ellingson | |
| 7,165,690 B2 | 1/2007 | Wu | |
| 7,186,457 B1 | 3/2007 | Zehner et al. | |
| 7,204,059 B2 | 4/2007 | Schiffmann et al. | |
| D558,270 S | 12/2007 | Beno | |
| D570,203 S | 6/2008 | Shiomoto | |
| 7,446,138 B2 | 11/2008 | Matuana et al. | |
| 7,449,517 B1 | 11/2008 | Rock | |
| 7,514,485 B2 | 4/2009 | Frenkel et al. | |
| 7,550,404 B2 | 6/2009 | Fisher et al. | |
| D596,178 S | 7/2009 | Chu | |
| 7,587,876 B2 * | 9/2009 | Bartlett | E06B 3/88 |
| | | | 52/800.11 |
| 7,635,731 B2 | 12/2009 | Sigworth et al. | |
| 7,765,768 B2 | 8/2010 | Liang et al. | |
| 7,816,431 B2 | 10/2010 | Heath et al. | |

(56) References Cited

U.S. PATENT DOCUMENTS

| | | | |
|---|---|---|---|
| 7,874,842 B2 | 1/2011 | Beno | |
| 7,886,501 B2 | 2/2011 | Bartlett et al. | |
| 7,930,866 B2 | 4/2011 | Carlson et al. | |
| 7,971,400 B2 | 7/2011 | Boldt et al. | |
| D659,693 S | 5/2012 | Termeer et al. | |
| 8,178,643 B2 | 5/2012 | Edstrom et al. | |
| D662,613 S | 6/2012 | Williams | |
| 8,230,652 B2 | 7/2012 | An | |
| 8,230,659 B2 * | 7/2012 | Langille | E06B 5/161 52/213 |
| 8,266,856 B2 | 9/2012 | Carlson et al. | |
| 8,276,320 B2 | 10/2012 | Erbrect et al. | |
| 8,371,079 B2 | 2/2013 | An et al. | |
| 8,438,808 B2 | 5/2013 | Carlson et al. | |
| 8,499,509 B2 | 8/2013 | Sibbett | |
| 8,597,446 B2 * | 12/2013 | Torriani | B29C 65/08 156/308.2 |
| 8,621,794 B2 | 1/2014 | An et al. | |
| 8,629,211 B2 | 1/2014 | Lavallee et al. | |
| 8,793,945 B2 | 8/2014 | An et al. | |
| 8,820,032 B2 | 9/2014 | Badger et al. | |
| 8,857,107 B1 | 10/2014 | Key | |
| 9,010,066 B1 | 4/2015 | Sand | |
| D735,189 S | 7/2015 | Ji | |
| 9,222,267 B2 | 12/2015 | Bergelin et al. | |
| 9,249,581 B2 | 2/2016 | Nilsson et al. | |
| 9,260,871 B2 | 2/2016 | Shaw | |
| 9,387,544 B2 | 7/2016 | Phebus et al. | |
| 9,534,402 B2 | 1/2017 | Shaw | |
| 9,714,673 B2 | 7/2017 | Phillips | |
| 9,803,413 B2 | 10/2017 | Macdonald | |
| 9,845,633 B2 | 12/2017 | Wang et al. | |
| 10,059,076 B2 * | 8/2018 | Torriani | B32B 3/08 |
| D846,157 S | 4/2019 | Luvison | |
| D850,657 S | 6/2019 | Luvison | |
| 10,486,399 B2 | 11/2019 | Chen et al. | |
| D872,386 S | 1/2020 | Seadler et al. | |
| D889,542 S | 7/2020 | Morris | |
| 10,718,151 B2 | 7/2020 | Macdonald et al. | |
| D899,521 S | 10/2020 | Li | |
| 10,801,248 B2 | 10/2020 | Macdonald et al. | |
| 10,809,828 B2 | 10/2020 | Weiss | |
| 10,941,606 B1 | 3/2021 | Kendall | |
| D928,230 S | 8/2021 | Li | |
| 11,105,143 B2 | 8/2021 | Macdonald et al. | |
| 11,111,715 B2 | 9/2021 | Macdonald et al. | |
| D933,622 S | 10/2021 | Li et al. | |
| D937,831 S | 12/2021 | Patterson et al. | |
| D943,671 S | 2/2022 | Shen | |
| 11,286,712 B2 | 3/2022 | Macdonald et al. | |
| D947,663 S | 4/2022 | Macdonald et al. | |
| 2002/0083663 A1 | 7/2002 | Ballantyne | |
| 2002/0108326 A1 | 8/2002 | Ackerman | |
| 2002/0121071 A1 | 9/2002 | Heung-Bin | |
| 2002/0174610 A1 | 11/2002 | Bennett et al. | |
| 2003/0145542 A1 * | 8/2003 | Chen | E06B 3/825 52/784.1 |
| 2003/0177725 A1 | 9/2003 | Gatherum | |
| 2005/0257455 A1 | 11/2005 | Fagan | |
| 2006/0123719 A1 | 6/2006 | Careri | |
| 2006/0123720 A1 | 6/2006 | Liu | |
| 2006/0174577 A1 | 8/2006 | O'Neil | |
| 2007/0022699 A1 | 2/2007 | Wang | |
| 2007/0074469 A1 | 4/2007 | Plagemann et al. | |
| 2007/0094985 A1 | 5/2007 | Grafenauer | |
| 2007/0113521 A1 | 5/2007 | Bartlett et al. | |
| 2007/0277455 A1 | 12/2007 | Flanigan et al. | |
| 2008/0072506 A1 | 3/2008 | Legoff | |
| 2008/0172957 A1 | 7/2008 | Kerscher | |
| 2008/0178541 A1 | 7/2008 | Kerscher et al. | |
| 2008/0178553 A1 | 7/2008 | Micho et al. | |
| 2008/0190052 A1 | 8/2008 | Kerscher | |
| 2008/0201938 A1 * | 8/2008 | Gauss | B29C 63/0026 52/745.19 |
| 2009/0013636 A1 | 1/2009 | Wilson | |
| 2009/0211184 A1 | 8/2009 | Kerscher | |
| 2009/0255197 A1 | 10/2009 | Chapman | |
| 2010/0107524 A1 | 5/2010 | Moss | |
| 2010/0192489 A1 | 8/2010 | An | |
| 2011/0083368 A1 | 4/2011 | Lin | |
| 2011/0138714 A1 | 6/2011 | Van Seters | |
| 2013/0263536 A1 | 10/2013 | Peck et al. | |
| 2014/0102035 A1 | 4/2014 | Rochman | |
| 2015/0015133 A1 | 1/2015 | Carbajal et al. | |
| 2015/0247349 A1 | 9/2015 | Terno | |
| 2016/0153705 A1 | 6/2016 | Dubuc et al. | |
| 2017/0058593 A1 | 3/2017 | Albrecht | |
| 2017/0241190 A1 | 8/2017 | Macdonald | |
| 2018/0216344 A1 | 8/2018 | Battaglia | |
| 2018/0258684 A1 | 9/2018 | Macdonald et al. | |
| 2018/0335078 A1 | 11/2018 | Andersson | |
| 2019/0071863 A1 | 3/2019 | Ting | |
| 2019/0226257 A1 | 7/2019 | Fontijn et al. | |
| 2019/0330911 A1 | 10/2019 | Macdonald et al. | |
| 2020/0040649 A1 | 2/2020 | Harvey et al. | |
| 2020/0043271 A1 | 2/2020 | Anderson et al. | |
| 2020/0191464 A1 | 6/2020 | Avhale et al. | |
| 2020/0263419 A1 | 8/2020 | Stahl et al. | |
| 2020/0307066 A1 * | 10/2020 | Schatz | B29C 63/0026 |
| 2020/0352355 A1 | 11/2020 | Diederichs et al. | |
| 2021/0032872 A1 | 2/2021 | Clarke et al. | |

FOREIGN PATENT DOCUMENTS

| | | | |
|---|---|---|---|
| DE | 3906594 A1 * | 5/1990 | |
| DE | 4127636 A1 * | 2/1992 | |
| EP | 3031588 A1 * | 6/2016 | B27D 5/003 |

OTHER PUBLICATIONS

Cheerfun, "LCD Writing Tablet", 71 ratings, ASIN: B095SNM8L2, Available Online on Amazon.com, Date of Question: Jul. 16, 2021, 20 pages.

Examination Search Report of the Canadian Patent Office dated Apr. 21, 2020 for related Canadian Patent Application No. 2997330.

Examination Search Report of the Canadian Patent Office dated Mar. 1, 2019 for related Canadian Patent Application No. 2997330.

Examination Search Report of the Canadian Patent Office dated Oct. 1, 2019 for related Canadian Patent Application No. 2997330.

* cited by examiner

DOOR STILE WITH COMPOSITE EDGE BANDING AND METHOD OF MANUFACTURING THE SAME

CROSS-REFERENCE TO RELATED APPLICATION

This application claims the benefit of, and priority to, U.S. Provisional Patent Application Ser. No. 63/183,705, filed May 4, 2021, the entire contents of which are hereby incorporated by reference.

BACKGROUND

1. Technical Field

The present disclosure relates to door systems and, more specifically, to edge banding of door stiles for door systems.

2. Discussion of Related Art

Door systems can include door panels with glass panels inserted within and supported by the door panel. A door panel includes stiles surrounding each of the glass panels that support and seal the glass panel within the door panel.

With reference to FIGS. 1 and 2, a prior art door stile 10 can be formed of a core 20. The core 20 may be formed of inner layers 22 of wood that are bonded together to form a solid core. The outer layers 24 of the core 20 may be a phenolic layer that enhances adhesion of paint to the core 20. The inner layers 22 and/or outer layers 24 may be bonded together by adhesives disposed between the layers 22, 24. The core 20 is capped on an outer side or edge with an outer edge band 30 and on an inner side or edge with an inner edge band 40. The outer edge band 30 and the inner edge band 40 may be bonded to the core by an adhesive. The outer edge band 30 and the inner edge band 40 may be solid wood or may be several pieces of wood finger jointed together to form a continuous edge band.

The outer edge band 30 and the inner edge band 40 may be generally rectangular when bonded to the core 20 as shown by the outer lines in FIG. 1 and be machined or profiled to the final profile to what is shown in the dashed lines. The final profile of the outer edge band 30 and the inner edge band 40 can be seen in FIG. 2.

As shown, the outer edge band 30 and the inner edge band 40 are formed of wood. In use, when the door stile 10 is exposed to an exterior of a structure, such as when part of an exterior door, the outer edge band 30 and the inner edge band 40 may be exposed to the environment. As a result, the outer edge band 30 and the inner edge band 40 may be susceptible to decay. Decay of the outer edge band 30 and the inner edge band 40 may result in a loss of a seal about the glass panel and/or the outer edge of the door stile 10. Decay around the glass panel may result in the glass panel becoming unseated from the door panel. As such, there is need to seal the outer edge band 30 and the inner edge band 40 to prevent decay.

SUMMARY

This disclosure relates generally to methods of manufacturing a door stile having a composite edge band. The composite edge bands are bonded to sides of the door stile with a hollow defined through the edge band such that the edge band flexes when compressed into a core of the door stile. The flexing of the edge band may enhance contact and thus, a bond between the edge band and the core. When profiled, portions of the edge band defining the hollows are removed from the edge bands.

In an embodiment of the present disclosure, a method of manufacturing a door stile includes bonding a composite edge band to a first side of a core and profiling the composite edge band. The edge band includes a hollow that is defined through the composite edge band to flex when compressed into the first side of the core. Profiling the composite edge band includes removing portions of the composite edge band that define the hollows.

In embodiments, profiling the composite edge band includes profiling the core. Profiling the composite edge band may include the composite edge band having a first profile along a first length of the door stile and a second profile along a second length of the door stile. The second profile may be shaped to receive a glass panel and the first profile may be shaped to the finished profile of the door edge.

In some embodiments, the method may include bonding another composite edge band to a second side of the core that is opposite the first side of the core. The method may include profiling the other composite edge band to define the final profile of the door stile. A portion of the other composite edge band may have a profile different from the composite edge band.

In certain embodiments, bonding the composite edge band to the first side of the core includes the composite edge band having a substantially rectangular profile.

In another embodiment of the present disclosure, a method of manufacturing a door stile includes bonding a first composite edge band to a first side of a core and profiling the composite edge band such that a hollow is removed from the first composite edge band to define a final profile of the door stile.

In embodiments, profiling the first composite edge band including removing a portion of the core. Profiling the first composite edge band may include the first composite edge band having a first profile along a first length of the door stile and a second profile along a second length of the door stile. The first profile may be shaped to a finished profile of the door edge. The second profile may be shaped to receive a glass panel.

In some embodiment, bonding a second composite edge band to a second side of the core opposite the first side. Profiling the second composite edge and may define the final profile of the door stile. A portion of the second composite edge band that has a profile different from the first composite edge band.

In another embodiment of the present disclosure, a door stile includes a core and a first composite edge band. The core has a first side and a second side that is opposite the first side. The first composite edge band is bonded to the first side of the core. The door stile has a first state in which state in which the core and the first composite edge band has a generally rectangular profile. The first composite edge band defines a hollow therethrough in the first state. The door stile has a second state in which the first composite edge band that is profiled such that the hollow is removed.

In embodiments, a portion of the core is removed from the first state to the second state. The first composite edge band may have a first profile along a first length thereof and a second profiled along a second length thereof that is different from the first profile. The first profile may be shaped to a final profile of the door edge and the second profile may be shaped to receive a glass panel.

In some embodiments, the door stile includes a second composite edge band that is bonded to the second side of the core. The core, the first composite edge, and the second composite edge may have a generally rectangular profile in the first state. The second composite edge band may include a hollow defined therethrough in the first state. The second composite edge band may be profiled such that the hollow is removed in the second state. The first composite edge band may have a first profile and the second composite edge band may have a second profile that is different from the first profile.

In certain embodiments, the core includes an inner phenolic layer, an outer phenolic layer, and one or more layers of wood disposed between the inner phenolic layer and the outer phenolic layer.

Further, to the extent consistent, any of the embodiments or aspects described herein may be used in conjunction with any or all of the other embodiments or aspects described herein.

BRIEF DESCRIPTION OF THE DRAWINGS

Various aspects of the present disclosure are described hereinbelow with reference to the drawings, which are incorporated in and constitute a part of this specification, wherein.

DETAILED DESCRIPTION

Figure 1:
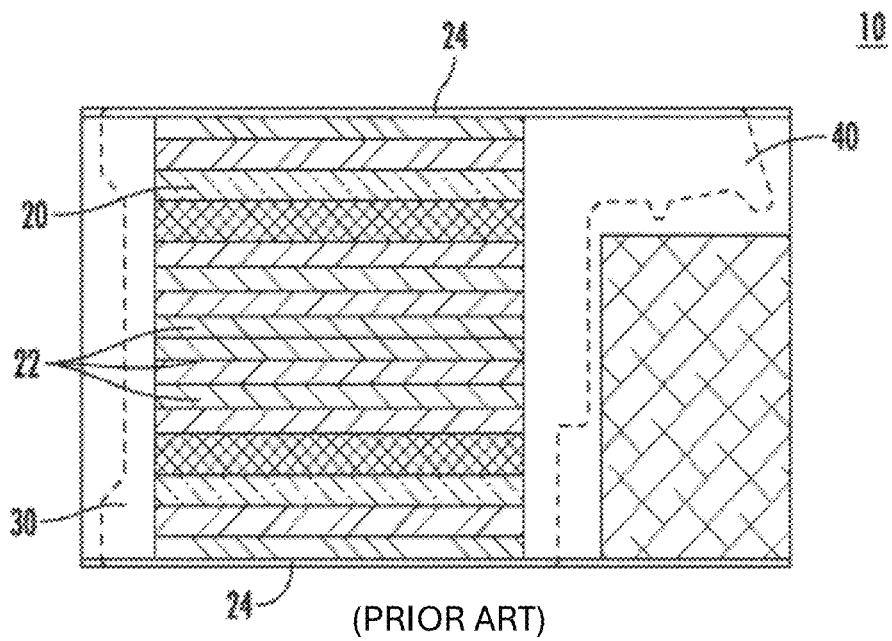
FIG. 1 is an end schematic view of a prior art door stile before profiling.
Figure 2:
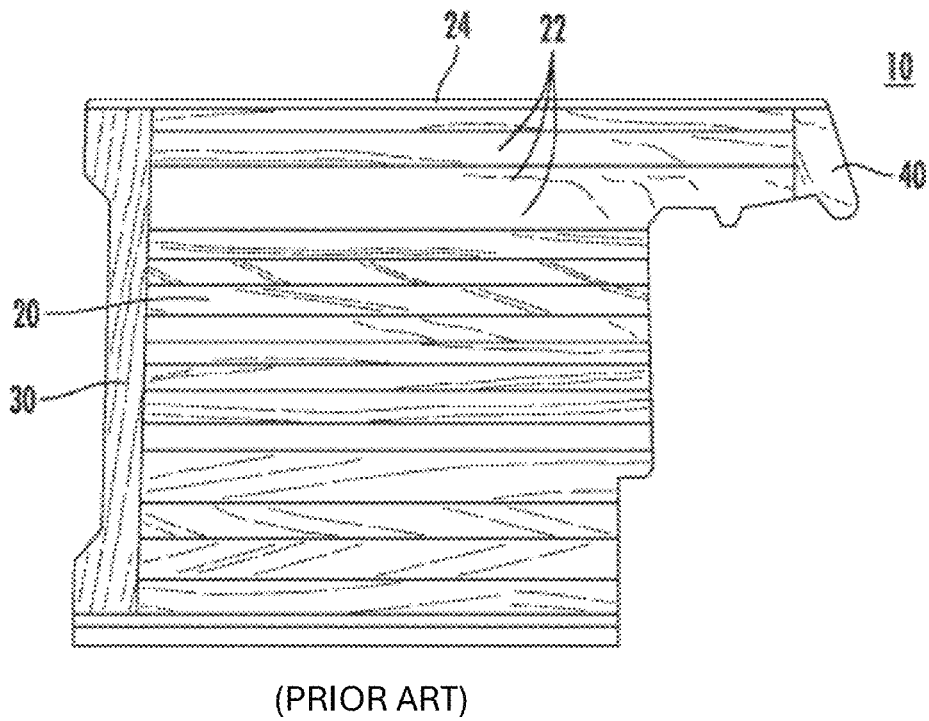
FIG. 2 is an end view of a profiled prior art door stile.

The present disclosure will now be described more fully hereinafter with reference to example embodiments thereof with reference to the drawings in which like reference numerals designate identical or corresponding elements in each of the several views. These example embodiments are described so that this disclosure will be thorough and complete, and will fully convey the scope of the disclosure to those skilled in the art. Features from one embodiment or aspect can be combined with features from any other embodiment or aspect in any appropriate combination. For example, any individual or collective features of method aspects or embodiments can be applied to apparatus, product, or component aspects or embodiments and vice versa. The disclosure may be embodied in many different forms and should not be construed as limited to the embodiments set forth herein; rather, these embodiments are provided so that this disclosure will satisfy applicable legal requirements. As used in the specification and the appended claims, the singular forms "a," "an," "the," and the like include plural referents unless the context clearly dictates otherwise. In addition, while reference may be made herein to quantitative measures, values, geometric relationships or the like, unless otherwise stated, any one or more if not all of these may be absolute or approximate to account for acceptable variations that may occur, such as those due to manufacturing or engineering tolerances or the like.

Figure 3:
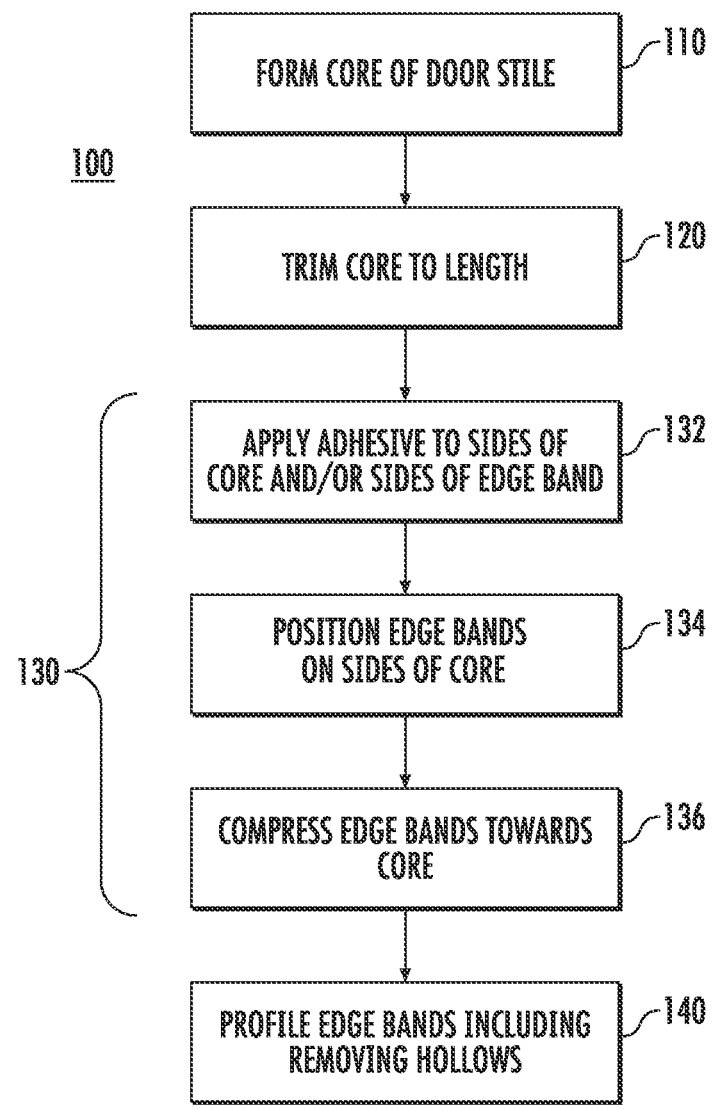
FIG. 3 is a flow chart of a method of manufacturing a door stile provided in accordance with an embodiment of the present disclosure.
Figure 4:
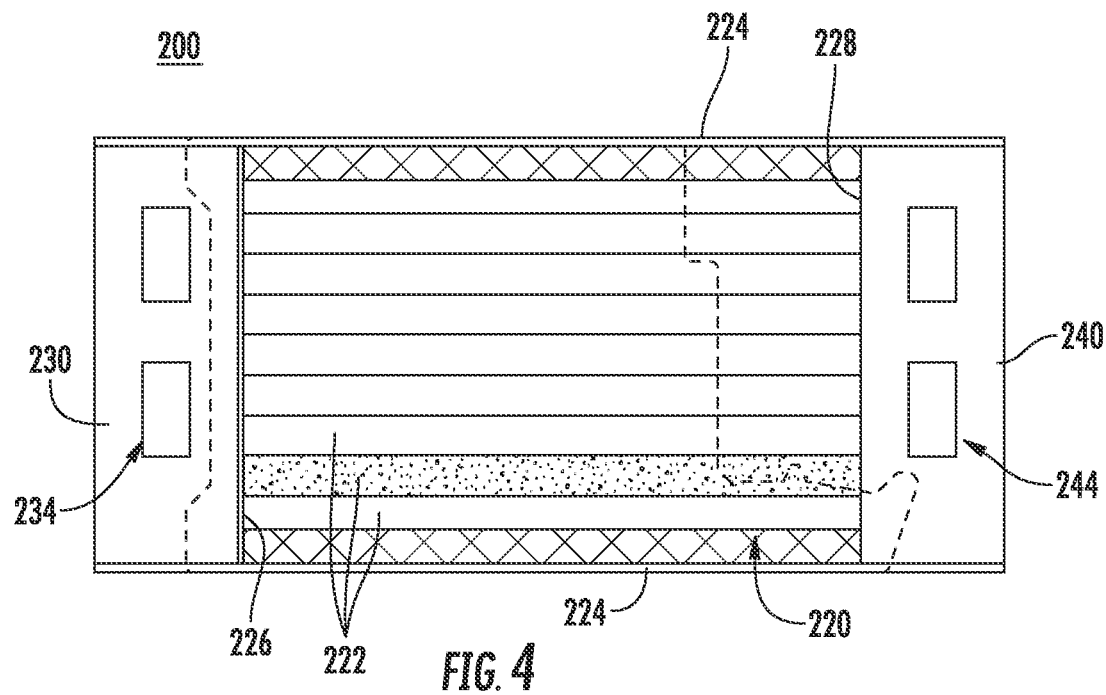
FIG. 4 is an end view of an exemplary door stile provided in accordance with the present disclosure before profiling.
Figure 5:
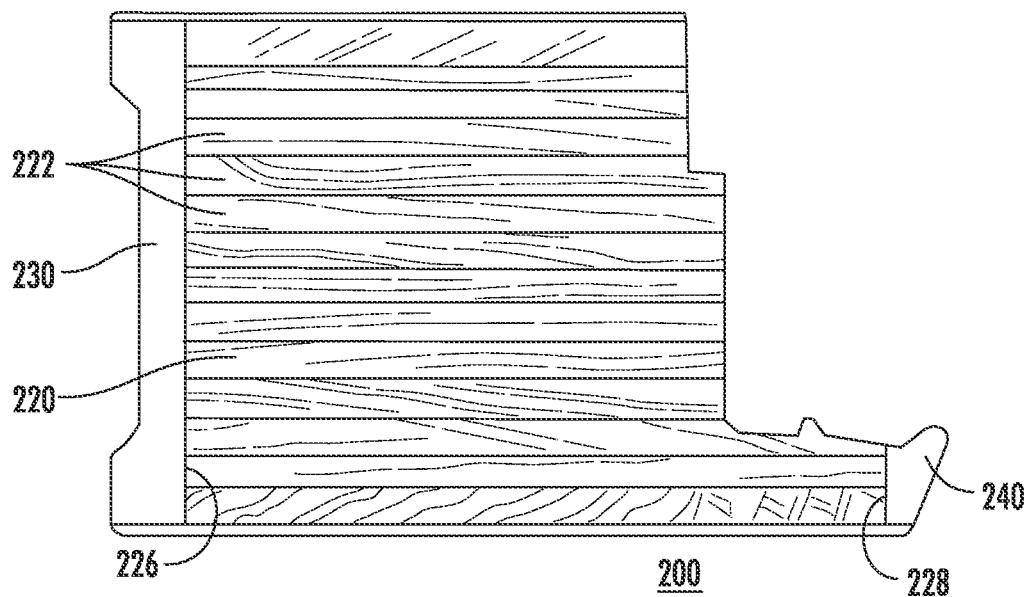
FIG. 5 is an end view of the door stile of FIG. 4 after profiling.

Referring now to FIG. 3, a method 100 of manufacturing a door stile is detailed in accordance with the present disclosure and with reference to the door stile 200 of FIGS. 4 and 5. The door stile 210 includes composite edge bands 230, 240 that are bonded to a core 220 to seal the core 220. The composite edge bands 230, 240 are paintable and not susceptible to decay.

To manufacture the door stile 210, a core 220 is formed of layers 222 that are bonded together to form a solid block of material (Step 110). When formed, the core 220 may include a phenolic layer 224 as the external layers of the core 220. The phenolic layers 224 may be sanded and may seal the external faces of the core 220. The core 220 may be cut to a width such that the core 220 has an exterior side 226 and an interior side 228 opposite the exterior side 226 (Step 120). The exterior side 226 and the interior side 228 may be substantially linear such that when viewed on end the core 220 is substantially rectangular as shown in FIG. 4. The core 220 may be similar to the core 20 detailed above.

With the core 220 trimmed, a composite edge band 230, 240 is bonded to each of the exterior side 226 and the interior side 228 of the core 220 (Step 130). To bond the composite edge bands 230, 240 to the core 220, an adhesive may be disposed along the exterior side 226 and the interior side 228 of the core 220 and/or the sides of the edge bands 230, 240 that oppose the core 220 (Step 132). With the adhesive disposed, the composite edge bands 230, 240 are positioned along the exterior side 226 and the interior side 228 of the core 220, respectively, such that the composite edge bands 230, 240 extend the entire length of the core 220 (Step 134). With the edge bands 230, 240 positioned, the edge bands 230, 240 are compressed towards one another with the core 220 disposed therebetween (Step 136). The composite edge bands 230, 240 are similar to one another and each extend a full length of the core 220. The external profile of each of the composite edge bands 230, 240 is substantially rectangular when bonded to the core 220. With particular reference to FIG. 4, the composite edge bands 230, 240 include one or more hollows 234, 244 that extend the length of the composite edge bands 230, 240. The hollows allow the composite edge bands 230, 240 to flex along the sides 226, 228 of the core 220 to provide a consistent surface to bond to the core 220. The flexing of the composite bands 230, 240 during bonding may enhance the bond between the composite bands 230, 240 and the core 220.

With the composite bands 230, 240 bonded to the core 220, the composite bands 230, 240 and the core 220 are profiled to a final profile of the door stile 210 (Step 140). When the composite bands 230, 240 are profiled, the portion of the edge bands 230, 240 defining the hollows 234, 244 are machined away such that the portion of the edge bands 230, 240 remaining are substantially solid and bonded to the core 220 along the respective one of the sides 226, 228 as shown in FIG. 5.

The composite bands 230, 240 may have a constant profile along the entire length of the door stile 210 or may have a first profile adjacent the top and bottom ends of the door stile 210 and a different profile in another portion of the length of the door stile 210. For example, the profile of the door stile 210 may be profiled along a portion thereof to receive a glass panel as shown in FIG. 5 with a portion of the length above and below the glass panel being profiled to support and retain the glass panel within the door stile 210 and to form a final profile of the door panel.

While several embodiments of the disclosure have been shown in the drawings, it is not intended that the disclosure be limited thereto, as it is intended that the disclosure be as broad in scope as the art will allow and that the specification be read likewise. Any combination of the above embodiments is also envisioned and is within the scope of the appended claims. Therefore, the above description should not be construed as limiting, but merely as exemplifications of particular embodiments. Those skilled in the art will envision other modifications within the scope of the claims appended hereto.

What is claimed:

1. A method of manufacturing a door stile, the method comprising:
   bonding a composite edge band to a first side of a core, the composite edge band including a hollow defined therethrough to allow the composite edge band to flex when compressed into the first side of the core; and
   profiling the composite edge band such that portions defining the hollow are removed to define a final profile of the door stile.

2. The method according to claim 1, wherein profiling the composite edge band includes removing a portion of the core.

3. The method according to claim 1, wherein profiling the composite edge band includes the composite edge band having a first profile along a first length of the door stile and a second profile along a second length of the door stile.

4. The method according to claim 3, wherein the second profile is shaped to receive a glass panel and the first profile is shaped to a finished profile of a door edge.

5. The method according to claim 1, further comprising bonding another composite edge band to a second side of the core opposite the first side.

6. The method according to claim 5, further comprising profiling the other composite edge band to define the final profile of the door stile, at least a portion of the other composite edge band having a profile different from the composite edge band.

7. The method according to claim 1, wherein bonding the composite edge band to the first side of the core includes the composite edge band having a substantially rectangular profile.

8. A door stile assembly, comprising:
   a core having a first side and a second side opposite the first side; and
   a first composite edge band bonded to the first side of the core such that the core and the first composite edge band have a generally rectangular profile, the first composite edge band having a length and including an internal hollow extending the length therethrough to allow the first composite edge band to flex when compressed into the first side the first composite edge band being configured to be profiled such that the hollow is removed.

9. The door stile assembly according to claim 8, wherein profiling the first composite edge band includes removing a portion of the core.

10. The door stile assembly according to claim 8, wherein the first composite edge band has a first profile along a first length thereof and a second profile along a second length thereof.

11. The door stile assembly according to claim 10, wherein the second profile is shaped to receive a glass panel and the first profile is shaped to a finished profile of a door edge.

12. The door stile assembly according to claim 8, further comprising a second composite edge band bonded to the second side of the core such that the core, the first composite edge band and the second composite edge band have a generally rectangular profile, the second composite edge band having a length and including the internal hollow extending the length therethrough to allow the second composite edge band to flex when compressed into the second side, the second composite edge band being configured to be profiled such that the hollow is removed.

13. The door stile assembly according to claim 12, wherein the first composite edge band has a first profile shaped to receive a finished profile of a door edge, and the second composite edge band has a second profile shaped to receive a glass panel, the first profile being different from the second profile.

14. The door stile assembly according to claim 8, wherein the core includes an inner phenolic layer, an outer phenolic layer, and one or more layers of wood disposed between the inner phenolic layer and the outer phenolic layer.

15. A method of manufacturing a door stile, the method comprising:
   bonding a first composite edge band to a first side of a core, the first composite edge band including a hollow defined therethrough; and
   profiling the first composite edge band such that the hollow is removed to define a final profile of the door stile.

16. The method according to claim 15, wherein profiling the first composite edge band includes removing a portion of the core.

17. The method according to claim 15, wherein profiling the first composite edge band includes the first composite edge band having a first profile along a first length of the door stile and a second profile along a second length of the door stile.

18. The method according to claim 17, wherein the second profile is shaped to receive a glass panel and the first profile is shaped to a finished profile of a door edge.

19. The method according to claim 15, further comprising bonding a second composite edge band to a second side of the core opposite the first side.

20. The method according to claim 19, further comprising profiling the second composite edge band to define the final profile of the door stile, a portion of the second composite edge band having a profile different from the first composite edge band.

* * * * *